United States Patent
Yamanaka et al.

(10) Patent No.: US 7,355,957 B2
(45) Date of Patent: Apr. 8, 2008

(54) OPTICAL DISC MEDIUM HAVING A SYSTEM INFORMATION RECORDING AREA OF LOW RECORDING DENSITY

(75) Inventors: Yutaka Yamanaka, Tokyo (JP); Toshiaki Iwanaga, Tokyo (JP); Tatsunori Ide, Tokyo (JP); Chosaku Noda, Kanagawa (JP); Yutaka Kashihara, Tokyo (JP); Akihito Ogawa, Tokyo (JP); Masaaki Matsumaru, Tokyo (JP)

(73) Assignees: NEC Corporation (JP); Kabushiki Kaisha Toshiba (JP)

( * ) Notice: Subject to any disclaimer, the term of this patent is extended or adjusted under 35 U.S.C. 154(b) by 686 days.

(21) Appl. No.: 10/822,373

(22) Filed: Apr. 12, 2004

(65) Prior Publication Data

US 2004/0257955 A1    Dec. 23, 2004

(30) Foreign Application Priority Data

Apr. 11, 2003  (JP)  ............................. 2003-107644
Mar. 26, 2004  (JP)  ............................. 2004-090902

(51) Int. Cl.
G11B 7/24    (2006.01)
G11B 7/013   (2006.01)

(52) U.S. Cl. .............................. 369/275.4; 369/53.31; 369/59.23

(58) Field of Classification Search ................ 369/275, 369/59
See application file for complete search history.

(56) References Cited

U.S. PATENT DOCUMENTS

| | | | |
|---|---|---|---|
| 5,986,987 A | 11/1999 | Taguchi et al. | ................ 369/48 |
| 6,038,208 A * | 3/2000 | Shikunami et al. | ...... 369/275.3 |
| 6,175,548 B1 | 1/2001 | Kashiwagi | ................ 369/275.1 |
| 6,430,128 B1 | 8/2002 | Kato et al. | ................ 369/47.53 |
| 2002/0006084 A1* | 1/2002 | Kawashima et al. | ....... 369/30.1 |
| 2002/0006104 A1 | 1/2002 | Sato et al. | ................ 369/275.3 |
| 2003/0003260 A1 | 1/2003 | Inoue et al. | ................ 428/64.4 |
| 2003/0012099 A1* | 1/2003 | Sako et al. | ............... 369/47.23 |
| 2003/0137914 A1* | 7/2003 | Kashihara et al. | ........ 369/59.22 |
| 2003/0161254 A1* | 8/2003 | Blankenbeckler et al. | ....... 369/275.3 |
| 2004/0174802 A1* | 9/2004 | Suzuki | ..................... 369/275.3 |

(Continued)

FOREIGN PATENT DOCUMENTS

JP         429941         9/1991

(Continued)

OTHER PUBLICATIONS

Ogawa, Masatsugu et al., Optimication of Write Conditions with a New Measure in High-Density Optical Recording, Jul. 29, 2004, Japanese journal of Applied Physics, vol. 43, No. 7B, pp. 4863-4866.*

Primary Examiner—Dwayne Bost
Assistant Examiner—Kezhen Shen
(74) Attorney, Agent, or Firm—Hayes Soloway P.C.

(57) ABSTRACT

In order to stably carry out reproduction of information in an optical disc medium (10) using a PRML (partial-response maximum-likelihood) method for reproducing the signal, the optical disc medium (10) has not only a data recording area (14) where data is recorded at high density but also a system information recording area (16) where information is recorded at low density and binary equalizing/reproducing can be easily made. Information required to circuit setting is recorded in the system information recording area.

3 Claims, 7 Drawing Sheets

U.S. PATENT DOCUMENTS

| | | | |
|---|---|---|---|
| 2004/0196776 A1* | 10/2004 | Yoshida et al. | 369/275.1 |
| 2004/0208101 A1* | 10/2004 | Ohkubo et al. | 369/53.35 |
| 2005/0111310 A1* | 5/2005 | Kobayashi et al. | 369/13.14 |

FOREIGN PATENT DOCUMENTS

| | | |
|---|---|---|
| JP | 728937 | 10/1995 |
| JP | 7334867 | 12/1995 |
| JP | 8293129 | 11/1996 |
| JP | 2001331944 | 11/2001 |
| WO | WO 03/102934 | 12/2003 |
| WO | WO 2004/006231 | 1/2004 |

* cited by examiner

OPTICAL DISC MEDIUM HAVING A SYSTEM INFORMATION RECORDING AREA OF LOW RECORDING DENSITY

BACKGROUND OF THE INVENTION

1. Field of the Invention

The present invention relates to an optical disc medium for use in carrying out recording/reproducing of information using an optical minute spot and an optical disc apparatus for recording and reproducing thereof.

2. Related Background Art

In an optical recording, recording or reproducing of information is carried out by forming a minute spot using an object lens on a disc recording surface. A recording/reproducing characteristic is determined by a size of the minute spot and by a length of a recording pit formed on the recording surface.

It is known in the art that the size of the spot is in proportion to a wavelength $\lambda$ of an optical source and is in inverse proportion to a numerical aperture NA of an object lens. When recording pits formed in the optical disc have a short cycle, an amplitude of a reproduced signal obtained as variations of a reflected light beam from the object lens becomes gradually small and becomes zero at $0.5 \times \lambda$NA because the reproduced signal is cut off.

FIG. 1 is a graph showing a relationship between a pit cycle in the optical disc and the amplitude of the reproduced signal. In FIG. 1, the abscissa represents the pit cycle and the ordinate represents the amplitude of the reproduced signal.

In almost all recording methods of the optical disc, front edges or rear edges of pits correspond to transitions between "1" and "0" of a train of encoded data. Accordingly, in almost all recording methods of the optical disc, a shortest pit length is equal to a shortest length between the pits. As a result, a half of the pit period shown in FIG. 1 is equal to a pit length. In this event, the pit length of a cut-off is equal to $0.25 \times \lambda$/NA.

Conventionally, compact discs (CDs) and digital versatile discs (DVDs) are widely used as the optical discs. In such conventionally widely used optical discs, reproduction of data is carried out by binary equalizing a reproduced signal and by determining presence or absence of the pits using a suitable slice. Accordingly, if an amplitude of the reproduced signal at a shortest pit is not at least level, it is impossible to sufficiently ensure reliability of reproduced data.

FIG. 2 shows measured examples of the shortest pit length and an error rate of the reproduced signal. In FIG. 2, the abscissa represents the shortest pit length($\times \lambda$/NA) and the ordinate represents the error rate of the reproduced signal. A broken line in the FIG. 2 shows a conventional example. The conventional example is a case where data reproduction is carried out by binary equalization. In the conventional example from FIG. 2, it is understood that the error rate becomes drastically worse when the pit length is less than $0.35 \lambda$/NA. A dot-dash-line in FIG. 2 shows a standard of the error rate which can be allowed practically. As a result, a limit of a practical shortest pit length in the conventional binary equalization becomes about $0.35 \lambda$/NA before and after the error rate becomes drastically worse in consideration of a margin of a device. For instance, about $0.37 \lambda$/NA is used in the DVD.

In recent years, as a technique for increasing high density recording of an optical disc, a reproduced signal detection method called partial-response maximum-likelihood (PRML) has started to be introduced. PRML is characterized by equalizing the reproduced signal into a multiple-valued signal such as partial-response equalization without equalizing the reproduce signal into a simple binary signal. For example, FIG. 3 shows a waveform example of the reproduced signal in a case of waveform equalizing the reproduced signal into a class of a partial-response called PR (1, 2, 2, 2, 1). In this class, the reproduced signal is equalized into a nine-valued level showing an arrow of a multiple-valued equalized level 5 in this figure. Furthermore, the multiple-valued equalized level is demodulated into a series of data signals which is in most cases by Viterbi decoding in accordance with regularity of temporal transition between the multiple-valued levels. As a result, it is possible to obtain a sufficiently practical reproduction characteristic in an area where the amplitude of the reproduced signal from the shortest pit is small. A solid line of FIG. 2 shows a surveyed example of a reproduce error rate in a case of using PRML. When PRML is used, it is understood that a good characteristic is obtained up to a short pit length compared with the conventional art.

When PRML is used, it is necessary to precisely control an amplitude value of the reproduced signal and a characteristic of a filter used in equalization. This is because the reproduced signal is equalized into a multiple-value without the simple binary value.

In almost all optical disc media, various information related to recorded data are recorded in a particular area. The particular area is called a system information recording area which is set with a general data recording area separated. If an amplitude characteristic of the recorded data and so on are recorded in the system information recording area as this information, it is possible to realize stable recorded data reproduction by setting a circuit according to the information on reproducing by using the optical disc apparatus.

However, in a format of the optical disc medium until now, the information is recorded in the system information recording area under a condition of recording density which hardly changes from recording density of data in the data recording area. Therefore, in order to read information from the system information recording area, a precise setting of operational parameters for a PRML circuit is required from the start. As a result, trial and error of a certain amount of setting values is unavoidable in order to realize stable signal reproduction.

SUMMARY OF THE INVENTION

It is therefore an object of the present invention to provide an optical disc medium and an optical disc apparatus which are capable of stable recording/reproducing.

An optical disc medium according to this invention is an optical disc medium of a disc-shaped on which a spiral-shaped recording track is formed. The optical disc medium comprises a data recording area and a system information recording area which are set thereon with the optical disc medium divided in a radial direction thereof. Recording density of information on the system information recording area is lower than that of data on the data recording area.

In the above-mentioned optical disc medium, the data recording area desirably may have a shortest pit length L1 of data to be recorded or reproduced that satisfies a relationship of $L1 < 0.35 \times \lambda$/NA, where $\lambda$ represents a wavelength of a light source for using recording/reproducing and NA represents a numerical aperture of an object lens. The data recording area desirably may have a PSRSNR value defined by quality evaluation index in a partial-response maximum-likelihood (PRML) that is not less than fourteen. The system information recording area desirably may have a shortest pit length L2 of data to be exclusively reproduced that satisfies a relationship of L2>0.50×λ/NA. The system information recording area desirably may have a track pitch which is wider than that of the data recording area.

In addition, in the afore-mentioned optical disc medium, the system information recording area preferably may lie in an inner peripheral side of the optical disc medium. The system information recording area preferably may have a shortest pit length which is substantially integer times as large as that of the data recording area. The system information recording area desirably may have specific recording density and may be set in particular radial positions of the optical disc medium. The optical disc medium may be one of three types of an exclusively reproduction type, an additionally recordable type, and a rewritable type. In this event, specific information preferably may be recorded on the system information recording area. The specific information is information for specifying that the optical disc medium is one of the three types.

In addition, an optical disc apparatus according to this invention is for recording or reproducing data in an optical disc medium comprising a data recording area and a system information recording area which are set thereon with the optical disc medium divided in a radial direction thereof. Recording density of information on the system information recording area is lower than that of data on the data recording area. The optical disc apparatus comprises a rotating arrangement for rotating said optical disc medium, an optical head for carrying out reproduction of information from the rotating optical disc medium to produce a reproduced signal. A binary equalizing circuit is for binary equalizing the reproduced signal when the optical head positions over the system information recording area. A partial-response maximum-likelihood (PRML) circuit is for partial-response equalizing the reproduced signal when the optical head positions over the data recording area.

DESCRIPTION OF THE PREFERRED EMBODIMENTS

Figure 4:
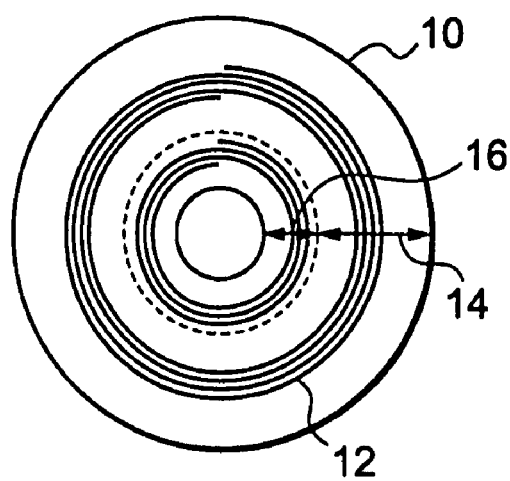
FIG. 4 is a schematic plan view showing an optical disc medium according to an embodiment of this invention.

FIG. 4 is a view for schematically showing an optical disc medium 10 of a disc shaped according to an embodiment of this invention. Referring to FIG. 4, on the optical disc medium 10, a spiral-shaped recording track 12 is formed. In addition, the optical disc medium 10 has a recording surface which is divided into a data recording area 14 and a system information recording area 16 by a radial position.

In the manner which is well known in the art, the optical disc media are classified into exclusively reproduction (read-only) type optical disc media, additionally recordable type optical disc media, and rewritable type optical disc media.

It will be assumed that the optical disc medium 10 is the exclusively reproduction (read-only) type optical disc medium. In this event, on the data recording area 14, data recording is carried out by a train of embossed pits. On the other hand, it will be assumed that the optical disc medium 10 is the additionally recordable type or the rewritable type optical disc medium. In this event, the data recording area 14 is an area where a recording film is formed on a track having groove structure or on a track having structure of both of land and groove and on which writing of recording data is carried out by an optical disc apparatus.

On the other hand, the system information recording area 16 is an exclusively reproduction (read-only) area for a general optical disc apparatus. Accordingly, data recording by the train of the embossed pits may be made to the system information recording area 16 although the optical disc medium 10 is the exclusively reproduction (read-only) type, the additionally recordable type, or the rewritable type. In the optical disc media of the additionally recordable type and the rewritable type, the recording film is formed on the system information recording area 16. However, there is no problem if reproduction from the embossed pits can be carried out. Furthermore, the system information recording area 16 may be formed by writing system data in the recording film at a manufacturing side of the optical disc medium 10 without forming the embossed pits.

On the system information recording area 16, recording density of the data recording area 14, an optimal reproduction condition, or the like may be recorded as information of the optical disc medium 10 in question. The system information recording area 16 may lie in any position as a set position on the optical disc medium 10 if the optical disc medium 10 is divided in a radial direction. However, it is desirable that the system information recording area 16 lies in an inner circumferential side of the optical disc medium 10. This is because the inner circumferential side of the optical disc medium 10 has a relatively small surface blurring of the medium to easily carry out pulling-in operation for a servo. In addition, in all kinds of optical disc media regardless of the exclusively reproduction (read-only) type, the additionally recordable type, and the rewritable type, it is preferable that the system information recording area 16 is set in the same radial position and a type of the medium is recorded in the system information recording area 16. This is because it is possible to shorten a time interval from a time instant when the optical disc apparatus determines the type of the optical disc medium 10 and so on to a time instant when the optical disc apparatus starts recording or reproducing operation. In addition, management information for copyright may be recorded in the system information recording area 16. In that case, inasmuch as it is impossible to alter information in the optical disc medium of the rewritable type also, it is possible to effectively fulfill its function.

In order to realize a large capacity and high density recording, the data recording area 14 has a shortest recording pit length which is not more than $0.35 \times \lambda/\mathrm{NA}$ on the assumption that reproduction is carried out in the PRML method. For instance, it will be assumed that a wavelength $\lambda$ of a light source is 405 nm and a numerical aperture NA of an object lens is 0.65. In this event, it is possible to realize data recording at the shortest pit length of about 0.2 μm. It will be assumed that a recording coding or modulation method is (1-7) modulation which has a wide detection window margin and which is suitable to high density recording. In this event, one bit data is converted into a recording channel bit of 1.5 bits. In addition, the shortest pit length on the recording track 12 is equal to two channel bit length. Under this condition, it will be assumed that the track pitch is set to about 0.34-0.40 μm. In this event, it is possible to realize a data recording capacity of 15-20 gigabytes (GB) at one side of the optical disc medium 10 having a diameter of 12 cm. The modulation method may be other methods as well as the (1-7) modulation. However, a modulation method, which has the shortest pit length of two channel bits and which converts one bit data into the recording channel bit of 1.5 bits, is suitable for high density. This is because it is easy to ensure a time window margin of signal detection.

Figure 3:
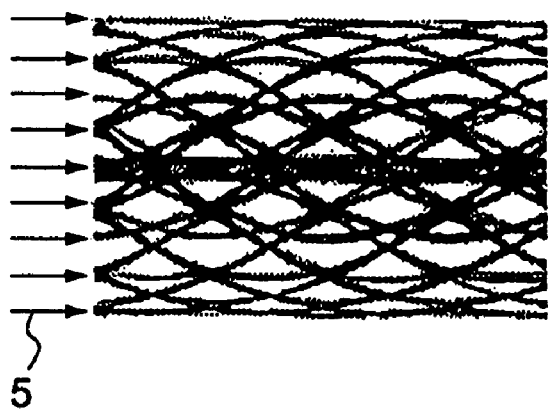
FIG. 3 is a view for use in describing partial response equalization.
Figure 5:
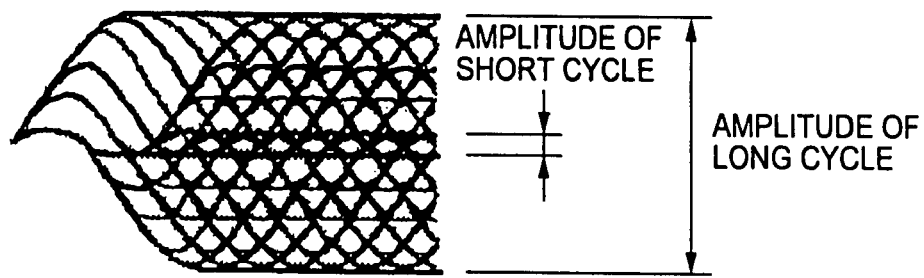
FIG. 5 is a view showing a characteristic example of a data recording area of the optical disc medium illustrated in FIG. 4.

FIG. 5 is a view showing an example of a reproduced signal of the data recording area 14 according to the (1-7) modulation. Referring to FIG. 5, it is understood that a repetition signal amplitude of the shortest recording pits is a considerable small amplitude which is 10% or less than that of a signal of long recording pits. Accordingly, it is difficult to ensure sufficient reliability of the reproduced data only when a simple binary equalization is carried out. It is possible to carry out the data reproduction of high reliability by equalizing the reproduce signal into a multiple-valued signal shown in FIG. 3 and by reproducing using Viterbi decoding.

However, a good reproduction characteristic cannot be obtained if the shortest recording pit length is too short. Accordingly, quality of the data recording area 14 is guaranteed by defining a signal quality of the PRML as an index as follows.

For the PRML, an algorithm called Viterbi decoding is employed to discriminate data. According to the Viterbi decoding, every clock period, the square of a difference between the value of a reproduced signal and a predetermined level defined by a partial response is calculated, the square sum is obtained along each path, and a path providing the smallest square sum is selected to decode the data.

When the Euclid distance between the paths is small, a detection error tends to occur in the Viterbi decoding. The Euclid distance d between different paths is calculated as follows. It will be assumed that $B(D)=\Sigma b_k D_k$ denotes a polynomial defined based on a data string $b_k$ along one of the paths, $C(D)=\Sigma c_k D_k$ denotes a polynomial defined based on a data string $C_k$ along the other path ($b_k$ and $c_k$ are binary data of 1 or −1), and $H(D)=\Sigma h_k D_k$ is a polynomial defining a partial response equalization. When, by using B(D), C(D), and H(D), a polynomial N(D) defining an error vector is defined by $N(D)=(B(D)-C(D))H(D)=2\Sigma\epsilon_i D_i$, the Euclid distance d is defined as $d^2=4\Sigma\epsilon_i^2$, where D represents a time delay operator using a clock time as a unit, and $h_k$ represents a predetermined partial response equalization characteristic. The partial response equalization characteristic is represented as $PR(h_0, h_1, h_2, h_3, \dots)$ generally by using elements of $h_k$ that are not 0.

It will be assumed that the partial response is defined as $h_0=1$, $h_1=2$ and $h_2=1$, while $h_3$ and the following=0; that the data string $b_k$ is defined as $b_0=1$, $b_1=1$ and $b_2=-1$, while $b_3$ and the following=−1; and that the data string $c_k$ is defined as $c_0=-1$, $c_1=1$ and $c_2=1$, while $c_3$ and the following=−1. In this case, since $N(D)=2(1-D^2)(1+2D+D^2)=2\times(1+2D-2D^3-D^4)$, the Euclid distance d between the path along the data string $b_k$ and the path along the data string $c_k$ is obtained as $d^2=4\times(1\times1+2\times2+2\times2+1\times1)$.

To express the binary data, a combination of 1 and 0, or a combination of 1 and −1, is used, and the combination of 1 and −1 is used in the instant specification.

When the polynomial of the partial response equalization is defined, the Euclid distance d between the paths can be calculated for each set of tap coefficients $\epsilon_i$. For an optical disc, generally, a recording symbol $d \geqq 1$ is used to limit the run length. When, for example, the recording symbol is d=1, a mark having a length equal to or greater than 2T is recorded on the disc. In order to take this limitation into account for the calculation of the Euclid distance, restriction $\epsilon_i\epsilon_i \neq -1$ need only be provided for the set of tap coefficients $\epsilon_i$. That is, as the data string satisfying that $\epsilon_i\epsilon_{i+1}=-1$, (x, 1, −1, y), for example, can be used as the data string $b_k$ and (x, −1, 1, y) can be used as the data string $c_k$. However, since the pattern (1, −1, 1) or (−1, 1, −1) is prohibited by the limitation d=1, with x=−1 or y=1, the data string $b_k$ becomes a pattern that does not conform to the run length limitation (a pattern that can not exist), and with x=1 or y=−1, the data string $c_k$ is a pattern that is not compatible with the run length limitation. Therefore, a combination of the data strings $b_k$ and $c_k$ does not exist that satisfies $\epsilon_i\epsilon_{i+1}=-1$, while the run length limitation is satisfied. Further, when the length of a mark recorded on the disc is equal to or greater than 3T, only the restriction imposed by $\epsilon_i\epsilon_{i+1} \neq -1$ and $\epsilon_i\epsilon_{i+2} \neq -1$ need be provided.

While, for example, the data string $b_k$ is used as a reference, the probability whereat a detection error will occur for the Euclid distance d between the two paths is equivalent to the probability whereat $\Sigma(y_k - \Sigma b_{k-i} h_i)^2$ will be greater than $\Sigma(y_k - \Sigma c_{k-i} h_i)^2$ due to noise. When the data string $b_k$ is used as a reference, $y_k - \Sigma b_{k-i} h_i$ is an equalization error. Further, the difference between $\Sigma(y_k - \Sigma b_{k-i} h_i)^2$ and $\Sigma(y^* - \Sigma c_{k-i} h_i)^2$ may be observed using the following method. An error vector is defined by regarding, as the elements of a vector, the coefficients of the polynomial defined by using the difference between B(D)H(D) and C(D)H(D), and the equalization error is projected onto the error vector. In this case, the probability of the occurrence of a detection error is defined as the probability whereat the magnitude of the noise (the variance of the noise) projected onto the error vector is greater than half the Euclid distance between the paths. Therefore, when the ratio of the Euclid distance between the paths to the variance of the noise projected onto the error vector need only be calculated to estimate the quality of a signal. When data are obtained in advance when the recording condition is adjusted, this data string may be used as a reference data string, and when such data have not yet been obtained, probable binary data that are obtained by a Viterbi decoder may be used as the reference data string.

It will be assumed that the data string $b_k$ is defined as $b_0=-1$ and $b_1=1$ and $b_2$ and the following=1, and that the data string $c_k$ is defined as $c_0=1$ and $c_1$ and the following=1. Under the circumstances, $\alpha_0=0$ and $\alpha_1$ and the following=0 are obtained while $A(D)=C(D)-B(D)=2\Sigma\alpha_j D_j$. When, for example, $h_0=1$, $h_1=2$, $h_2=2$ and $h_3=1$ are used as $H(D)$ (corresponding to PR(1,2,2,1)), the coefficients $\epsilon_i$ of polynomial $N(D)=A(D)H(D)=2\Sigma\epsilon_i D_i$, which defines the error vector, are (1,2,2,1) in the order $\epsilon_0$, $\epsilon_1$, $\epsilon_2$ and $\epsilon_3$. Therefore, the probability whereat the data string $b_k$ will be erroneously regarded as the data string $c_k$ for PR(1,2,2, 1) equals the probability whereat the magnitude of the equalization error projected onto 2×(1,2,2, 1) is greater than half the Euclid distance (in this case, $2\times(1+2\times2+2\times2+1)^{1/2}$) between the two paths. Inasmuch as the projection of the equalization error onto the error vector is represented by the following equation (1):

$$\frac{2\sum_i \epsilon_i v_{k+i}}{2\sqrt{\sum_i \epsilon_i^2}} \tag{1}$$

the variance CN of the noises projected onto the error vector is represented by the following equation (2):

$$CN = \frac{\sum_{k=1}^{N}\left(\sum_i \epsilon_i v_{k+1}\right)^2}{N\sum_i \epsilon_i^2} \tag{2}$$

Further, inasmuch as half of the Euclid distance between the two paths, which corresponds to the signal amplitude, is represented by the following equation (3), $$\sqrt{\sum_i \epsilon_i^2} \tag{3}$$

and inasmuch as the square E of the amplitude that corresponds to electric power is represented by the following equation (4), $$E = \sum_i \epsilon_i^2 \tag{4}$$

E/CN can be obtained as an index that is correlated with the error probability. Inasmuch as coefficient 2 related to the entire A(D) and N(D) does not affect the calculation results, the same results are obtained through the calculation using $A(D)=\Sigma\alpha_i D_i$ and $N(D)=\Sigma\epsilon_i D_i$, with the coefficient 2 being omitted.

As is described above, $v_k=(y_k-\Sigma a_{k-i}h_i)$ is defined as an equalization error wherein $y_k$ denotes the value of a signal reproduced for each clock period, $a_k$ denotes a predetermined data string for generation of a target signal and $h_k$ denotes a predetermined partial response characteristic, while D is defined as a time delay operator using a clock time as a unit. Further, $A(D)=\Sigma\alpha_j D_j$ is a polynomial, defined by using a coefficient $\alpha_j$ having a value either of 1, 0 or −1, that satisfies $\alpha_j\alpha_{j+1}\ne-1$, and $H(D)=\Sigma h_k D_k$ is a polynomial that defines a partial response. Then, when the polynomial defined as $N(D)=A(D)H(D)=\Sigma\epsilon_j D_j$ is employed to calculate the signal quality evaluation index value PRSNR defined by the following equation (5), $$PRSNR = \frac{N\left(\sum_i \epsilon_i^2\right)^2}{\sum_{k=1}^{N}\left(\sum_i \epsilon_i v_{k+i}\right)^2} \tag{5}$$

the probability that a detection error will occur can be obtained, i.e., the signal quality of a reproduced signal can be evaluated as the value of the PRSNR.

In the above explanation, the data strings $b_k$ and $c_k$ have been used as an example combination of data strings that tend to be erroneously regarded. However, when the variance of the noises projected onto the error vector is to be calculated, specific data strings need not always be selected to obtain an equalization error. That is, for the calculation of the equalization error variance, a time corresponding to the data string $b_k$ need not be extracted from the data string $a_k$ used for the generation of a target signal. Instead, the equalization error obtained for each clock time can be used to calculate the variance. This is because, so long as the equalization errors are stochastically distributed in accordance with the Gaussian distribution, the same results are obtained either by extracting a specific portion to calculate the variance, or by using the entire portion to calculate the variance. The variance of the noises may be calculated by using only a specific data string $b_k$, however, when the variance of the equalization errors is calculated without selecting a pattern, the configuration of the circuit is simplified.

The description will proceed to examples of the signal quality evaluation index value PRSNR surveyed from random data modulated on the basis of the (1-7) modulation method which is effective to high density. An optical head having a wavelength of 405 nm and a numerical aperture (NA) of 0.65 for an object lens was employed to measure values under various recording density conditions.

The reproduced waveform was equalized to PR(1,2,2,2,1) to measure a bit error rate bER and the signal quality evaluation index value PRSNR. To measure the bit error rate bER, the original data recorded on the optical disc were compared with the binary data obtained through Viterbi decoding. To measure the signal equality evaluation index value PRSNR, $10^5$ values of reproduced waveform obtained for each T after PR equalization and the binary data obtained by Viterbi decoding were employed.

The (1-7) modulated codes are codes having a limitation $d\geq1$, and relative to PR(1,2,2,2,1), the Euclid distance is reduced in accordance with the tap coefficients $\epsilon_j$ shown in Table 1 (shown below). A set of tap coefficients $\epsilon_j$ discriminated by pattern 1 in Table 1, i.e., (1 2 2 2 1), is an error vector that is determined by two data strings that tend to be erroneously discriminated in Viterbi detection, e.g., $b_k$:(1 1 1 1 −1 −1 . . . ) and $c_k$: (−1 1 1 1 −1 −1 . . . ), and partial response equalization characteristic (1 2 2 2 1). As for the sets of tap coefficients $\epsilon_i$ for pattern 2 and the following patterns in the undermentioned Table 1, the number of 0s inserted between (1, 2, 1) and (−1, −2, −1) and the upper limit number of 0s inserted between (1, 2, 1) and (1, 2, 1) are determined by the upper limit repetitions of the mark/space for 2T (the upper limit repetitions of a data string of +1 +1

−1 −1, e.g., −1 −1 −1 +1 +1 −1 −1 −1 is counted as one repetition and −1 −1 −1 +1 +1 −1 −1 +1 +1 +1 is counted as two repetitions). That is, when the upper limit repetitions of the mark/space for 2T is (2n+1), the maximum number (4n+1) of 0s are inserted between (1, 2, 1) and (−1, −2, −1). When the upper limit repetitions for the mark/space for 2T is (2n+2), the maximum number (4n+3) of 0s are inserted between (1, 2, 1) and (1, 2, 1). Therefore, the signal quality evaluation index value PRSNR need only be calculated while taking into account the pattern up to the upper limit. In the following Table 1, the tap coefficients $\epsilon_i$, up to a maximum of five repetitions for 2T, are shown.

TABLE 1

Example sets of $\epsilon_i$

| PATTERN j | $\epsilon_i$ | $\Sigma\epsilon_i^2$ |
|---|---|---|
| 1 | 12221 | 14 |
| 2 | 1210-1-2-1 | 12 |
| 3 | 121000121 | 12 |
| 4 | 12100000-1-2-1 | 12 |
| 5 | 1210000000121 | 12 |
| 6 | 121000000000-1-2-1 | 12 |

Figure 6:
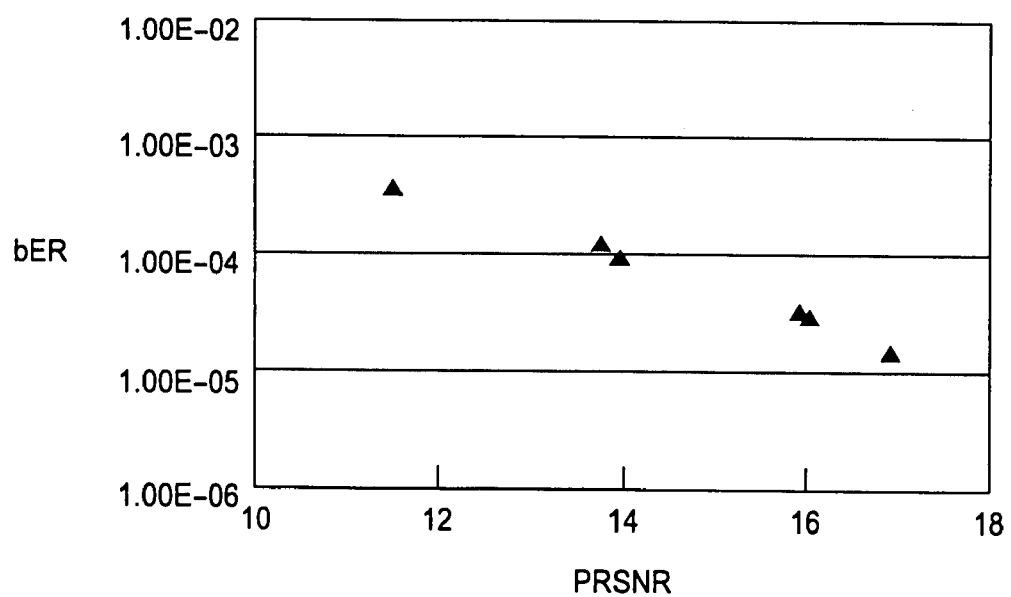
FIG. 6 is a graph showing a signal quality characteristic in the partial response equalization.

Specifically, FIG. 6 shows, as the signal quality evaluation index value PRSNR, a minimum one of five calculated values of the signal quality evaluation index value PRSNR defined by the above-mentioned equation (5). Although numerical values for each pattern are clearly expressed, the minimum one of the values defined by the above-mentioned equation (5) is either one among the patterns 1, 2, and 3 in each recording density in which data of FIG. 6 is obtained. Accordingly, calculation of the equation (5) may be made for only the patterns 1-3 without consideration of all patterns shown in Table 1. The equation (5) for the patterns 1-3 may be expressed by the following equations (6), (7), and (8):

Pattern 1: PRSNR=$14/\sigma_1^2$, $$\sigma_1^2 = R_0 + (12R_1 + 8R_2 + 4R_3 + R_4)/7 \quad (6)$$

Pattern 2: PRSNR=$12/\sigma_2^2$, $$\sigma_2^2 = R_0 + (8R_1 + R_2 - 4R_3 - 6R_4 - 4R_5 - R_6)/6 \quad (7)$$

Pattern 3: PRSNR=$12/\sigma_3^2$, $$\sigma_3^2 = R_0 + (8R_1 + 2R_2 + R_4 + 4R_5 + 6R_6 + 4R_7 + R_8)/6 \quad (8)$$

In the above-mentioned equations (6)-(8), $R_i$ represents a correlation of noises and is defined by the following equation (9):

$$R_i = E[v_k v_{k+i}] \quad (9)$$

Figure 7:
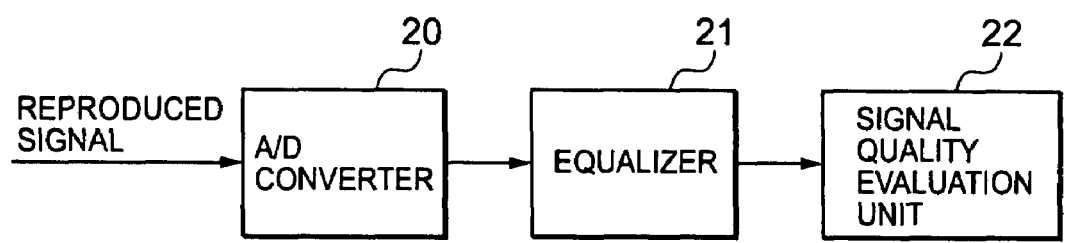
FIG. 7 is a block diagram showing a configuration example for a functional block used to measure signal quality.

FIG. 7 is a diagram showing an example of functional block for calculating a signal quality evaluation index value PRSNR. An A/D converter 20 performs sampling for a reproduced waveform in synchronism with a constant frequency, and an equalizer 21 including a PLL (phase locked loop) circuit obtains equalized reproduced waveform data each clock cycle. In the equalization process, while the noise component is suppressed to the extent possible, the reproduced waveform is equalized so that it is as similar as possible to a target waveform based on a PR waveform. A signal quality evaluation unit 22 calculates a value S of the signal quality evaluation index value PRSNR by using the received, equalized reproduced waveform to evaluate the quality of the reproduced waveform. When an exclusively reproduction (read-only) optical disc or a recordable optical disc on which data are recorded by another recording apparatus is employed, original data $a_k$ recorded on the optical disc are not always known in advance. In this case, binary data obtained by a discriminator (typically, a Viterbi decoder) included in the signal quality evaluation unit 22 may be substituted for the data $a_k$.

Figure 8:
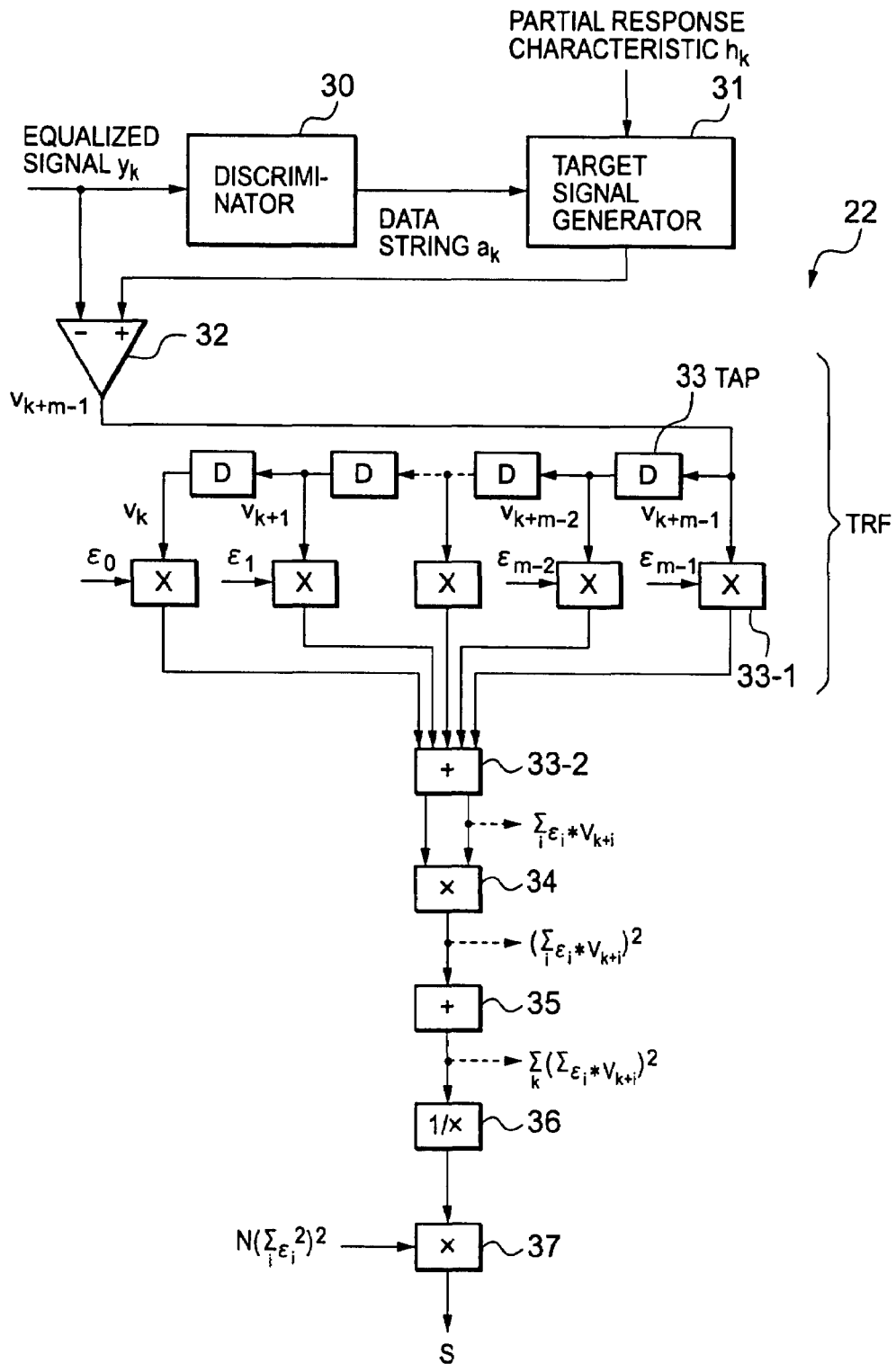
FIG. 8 is a block diagram showing a configuration example for a signal quality evaluation unit for calculating variance of equalization errors projected onto an error vector.

FIG. 8 is a detailed diagram showing the signal quality evaluation unit 22 in FIG. 7. It will be assumed that a reference PR waveform is denoted by $h_i$, and binary data obtained by a discriminator 30 (typically, a Viterbi decoder) is denoted by $a_k$. In this event, a target signal generator 31 generates a target signal $R_k$ based on the following equation (10).

$$R_k = \sum_i a_{k-i} \times h_i \quad (10)$$

Then, a comparator 32 calculates an equalization error $v_k$ that is the difference between a signal $y_k$, reproduced (equalized) for each clock cycle, and the target signal $R_k$. According to this configuration, in order to project the equalization error $v_k$ onto an error vector, the equalization error $v_k$ is delayed for each clock cycle by a plurality of taps 33, and the results are added by an adder 33-2 through a plurality of coefficient multipliers 33-1 each of which is for multiplying by tap coefficient $\epsilon_i$. In this configuration, the plurality of taps, namely, unit delay elements 33, the plurality of coefficient multipliers 33-1 and one adder 33-2 constitute a transversal filter TRF.

The tap coefficient $\epsilon_i$ is a coefficient of the N(D) described above. When each set of tap coefficients $\epsilon_i$ is identified by using "j", and a value S of a corresponding signal quality evaluation index value PRSNR is defined as a j-th signal quality evaluation value $S_j$, a total number m of the taps 33(D) in FIG. 8 is changed, depending on j. It will be assumed that a set of tap coefficients $\epsilon_j$ relative to j=1 is $\epsilon_0=1, \epsilon_1=1, \epsilon_2=0, \epsilon_3=0, \epsilon_4=1$ and $\epsilon_5$ and the following=0, and that a set of tap coefficients $\epsilon_j$ relative to j=2 is $\epsilon_0=1, \epsilon_1=2, \epsilon_2=1$ and $\epsilon_3$ and the following=0. In this case, m=4 is obtained to calculate the first signal quality evaluation value $S_1$, and m=2 is obtained to calculate the second signal quality evaluation value $S_2$. When changing of the number of taps in accordance with the combination j is complex, only a satisfactorily large number of taps (e.g., 15 to 20) need be prepared, and only the tap coefficients that are not required for the calculation need be set to 0.

Following this, a multiplier 34 calculates the square of equalization error $\Sigma \epsilon_i \times v_{k+i}$, which is obtained through the plurality of tap coefficient multipliers 33-1 and the adder 33-2, and an adder 35 multiplies the resultant square by the total number N of equalization error samples. As a result, a value is obtained that is proportional to the variation of the noises projected onto the error vector. When this value is divided by N and $\Sigma \epsilon_i^2$, a variation value is obtained, and since N and $\Sigma \epsilon_i^2$ are constants, these are employed as the coefficients by a multiplier 37. A divider 36 calculates the reciprocal of the obtained value, namely, the output of the adder 35, and the multiplier 37 calculates a product $(N\Sigma\epsilon_i^2) \times \Sigma\epsilon_i^2$. As a result, the value S of the signal quality evaluation index value PRSNR is obtained. Actually, (N+m) reproduced waveform samples are required; however, since m is at most 20 while N is equal to or greater than $10^4$, in the instant specification, N is consistently employed as the number of samples.

A pattern having a polarity opposite to that of the pattern shown in the above-mentioned Table 1 (for example, (−1 −2

−2 −2 −1) relative to pattern 1) may be employed; however, since the value S of the obtained signal quality evaluation index value PRSNR is the same, only a pattern having a predetermined polarity must be taken into account (either polarity can be determined, but there is no need to evaluate both).

FIG. 6 is a graph showing the relationship between the measured value of the signal quality evaluation index value PRSNR and the bit error rate bER. In FIG. 6, the abscissa represents the measured value of the signal quality evaluation index value PRSNR and the ordinate represents the bit error rate bER. Inasmuch as the bit error rate bER allowed in a real optical disc system is about $1\times10^4$, it was understood that it is necessary that the value of the signal quality evaluation index value PRSNR is fourteen or more.

Figure 1:
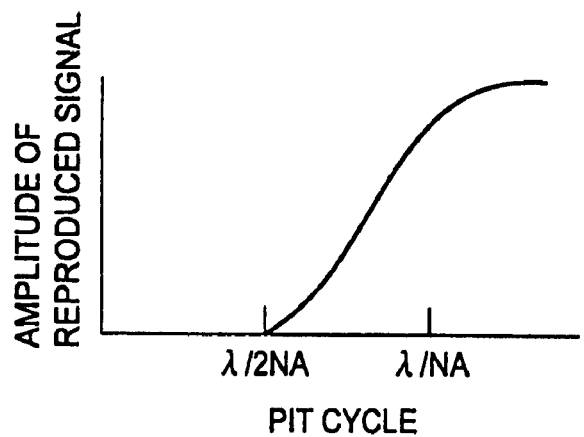
FIG. 1 is a graph for use in describing a characteristic of signal reproduction.
Figure 2:
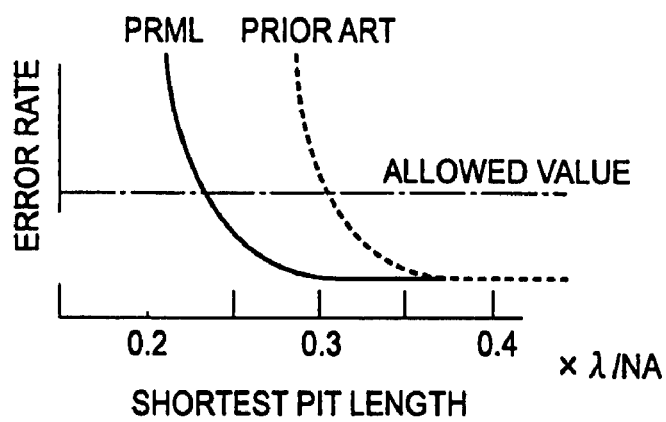
FIG. 2 is a graph for use in describing a recoding density characteristic.

On the other hand, it is necessary for the system information recording area 16 (FIG. 4) that it is possible to realize reproduction due to the simple binary equalization so that it needs less individual setting in the optical disc apparatus. This is because, the PRML method for reproducing data recorded at high density or the like requires optimization of setting of constants in a circuit for waveform equalizing a signal and so on in the manner which is described above. Accordingly, it is necessary for the system information recording area 16 to sufficiently reduce the recording density. If the shortest recording pit length generally lies in a range between $0.4\times\lambda/NA$ and $0.5\times\lambda/NA$, repetition signal amplitude of short recording pits can sufficiently ensure about 30% or more of the signal amplitude of long recording pits as shown in FIG. 1. Under the circumstances, the error rate has a practically sufficient value as illustrated in FIG. 2.

However, this density condition gives rise to a problem if stable data reproduction due to the binary equalization is carried out not only for the exclusively reproduction (read-only) type optical disc medium but also for the additionally recordable type or the rewritable type optical disc medium.

Figure 9:
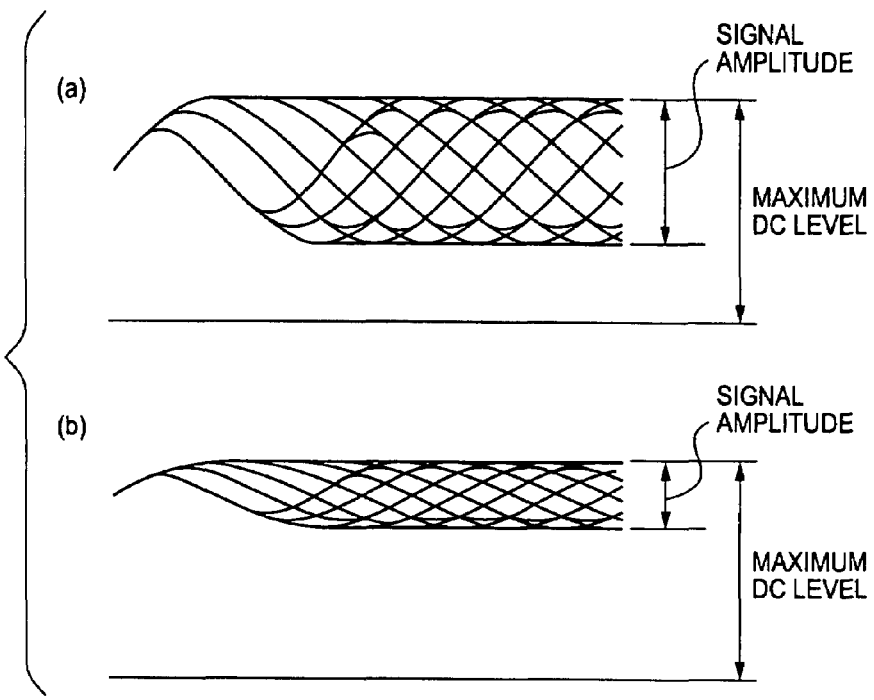
FIG. 9 shows characteristic examples (a) and (b) of a system information recording area of the optical disc medium illustrated in FIG. 4.

It will be assumed that the optical disc medium 10 is the exclusively reproduction (read-only) type optical disc medium. In this event, it is possible to use embossed pits having a phase depth of about quarter-wave in a similar manner as the data recording area 14 (FIG. 4). Accordingly, as shown in (a) in FIG. 9, it is possible for also the system information recording area 16 (FIG. 4) to sufficiently make the signal amplitude large compared with a maximum DC level.

On the other hand, it will be assumed that the optical disc medium 10 is the additionally recordable type optical disc medium. In this event, groove structure formed in the data recording area 14 (FIG. 4) has a shallow groove having a phase depth of about one-eighth wavelength to obtain sensitivity of a track error signal according to a push-pull method. It will be assumed that embossed pits for the system information recording area 16 (FIG. 4) are formed at the same phase depth. Under the circumstances, as shown in (b) in FIG. 9, it is impossible to sufficiently obtain the signal amplitude compared with the maximum DC level and sufficient reliability of the data reproduction may be obtained caused by influence of variations of the DC level.

In order to explain in more detail, in the specification, modulation factor of a signal is defined as a half value of a maximum amplitude of the signal compared with the DC level of a center in an amplitude of the reproduced signal. Under the circumstances, the exclusively reproduction (read-only) type optical disc medium has the modulation factor of 50% or more while the additionally recordable type optical disc medium has the modulation factor of about 15-20%.

Accordingly, the present co-inventors studied a condition under which a sufficient reproduced signal characteristic is obtained in such shallow pits. As a result, the present co-inventors confirmed that a stable characteristic is obtained when the shortest pit length is $0.50\times\lambda/NA$ or more.

Figure 10:
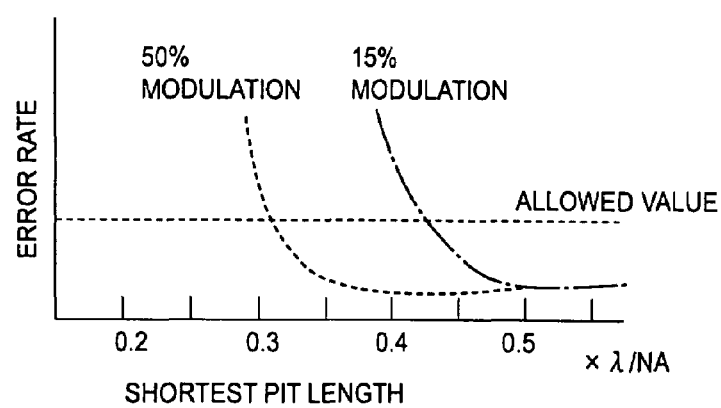
FIG. 10 is a graph showing variations of reproduced error rate versus a shortest pit length in cases where a modulation factor is 50% and 15%.
Figure 11:
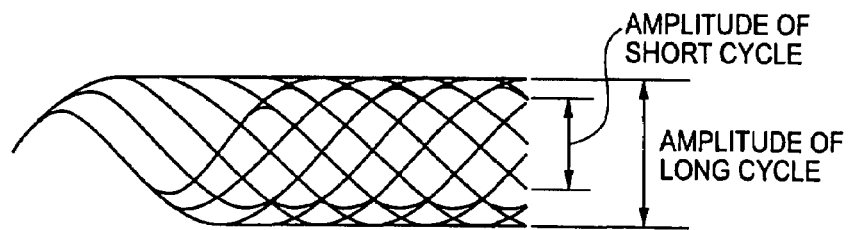
FIG. 11 is a view showing a characteristic example of a system information recording area of this invention.

FIG. 10 shows variations of the reproduced error rate for the shortest pit length when the modulation factor is 50% and 15%. In FIG. 10, the abscissa represents the shortest pit length and the ordinate represents the reproduced error rate. It is understood that it is possible to ensure a characteristic of no problem in the modulation factor of 15% if the shortest pit length is $0.50\times\lambda/NA$ or more. In this event, as shown in FIG. 11, the repetition signal amplitude of short recording pits can always ensure 50% or more of the signal amplitude of long recording pits.

Referring to FIG. 4, in order to further stabilize tracking servo operation required to signal reproduction and so on, the system information recording area 16 has a track pitch which is wider than that of the data recording area 14. When the data recording area 14 has the track pitch, for example, of 0.4 μm, the system information recording area 16 has the track pitch of about 0.68 μm. If such a setting is made, in a case, for example, where reproduction is made using an optical system which has a wavelength λ of 405 nm and a numerical aperture NA of an object lens of 0.65, a beam diameter on the optical disc medium 10 is about 0.6 μm. It is therefore advantageous for the system information recording area 16 in that there is hardly any effect of interference on adjacent tracks and it is possible to obtain a stable track error signal.

Recording encoding in the system information recording area 16 may be similar to that of the data recording area 14 or may be different from that thereof. If it is important to support two types of encodings in the optical disc apparatus side, it is preferable that the recording encodings are similar to each other. In addition, if data formats indicative of data structure to be recorded are similar to each other between the system information recording area 16 and the data recording area 14, signal processing is easier. If, as the data format, a VFO portion which serves as a signal frequency bit area is set in a header of each error correction block, a further stable signal detection is made.

Furthermore, it is effective that the shortest pit length of the system information recording area 16 is set to about integer times as large as the shortest pit length of the data recording area 14. In that case, when an access is made extending over two areas 14 and 16, it is advantageous in that a PLL for reproducing a clock for the signal can easily operate without hardly changing a rotation speed of the optical disc or altering setting in a reproducing circuit. Of course, it is most effective that the system information recording area 16 has the same recording line density and the same track pitch in all of the exclusively reproduction (read-only) type optical disc medium, the additionally recordable type optical disc medium, and the rewritable type disc medium. Accordingly, the shortest pit length of the system information recording area 16 may be substantially nearly a value of the integer times as large as the shortest pit length of the data recording area 14 without just integer times. If a difference lies in 30% or less of the integer times, the PLL circuit may sufficiently operate even the same setting.

Figure 12:
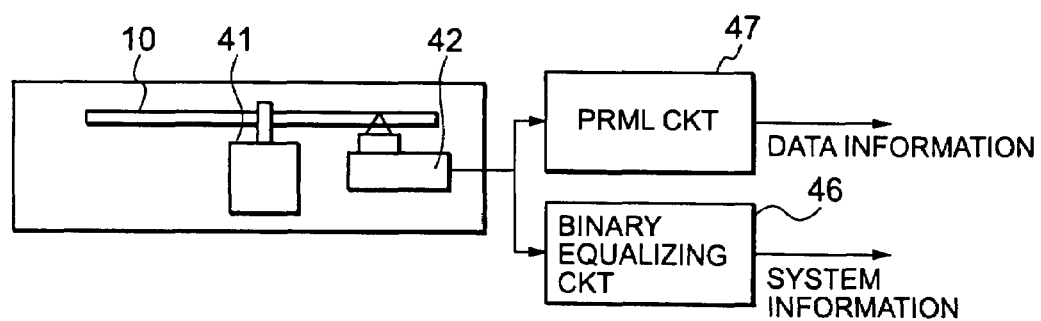
FIG. 12 is a block diagram showing an example of an optical disc apparatus according to an embodiment of this invention.

FIG. 12 is a view showing one example of an optical disc apparatus according to an embodiment of this invention. As shown in FIG. 12, in the optical disc medium 10 mounted on a rotation shaft of a spindle motor 41, recording or reproducing is carried out by an optical head (or an optical pickup) 42. That is, the spindle motor 41 serves as a rotating arrangement for rotating the optical disc medium 10. The optical head 42 carries out reproduction of information from the rotating optical disc medium 10 to produce a reproduced signal. When information recorded in the system information recording area 16 (FIG. 4) is reproduced, reproduction of system information is carried out by using a binary equalizing circuit 46. In other words, when the optical head 42 positions over the system information recording area 16, the binary equalizing circuit 46 binary equalizes the reproduced signal. By using the system information, setting of a PRML circuit 47 is carried out. On reproducing data from the data recording area 14 (FIG. 4) having high recording density, partial response equalization is carried out by using the PRML circuit 47 to reproduce data information on the basis of Viterbi decoding. In other words, when the optical head 42 positions over the data recording area 14, the PRML circuit 47 partial-response equalizes the reproduced signal.

Determination whether either the binary equalizing circuit 46 or the PRML circuit 47 is used is carried out, for example, as follows. It will be assumed that a radius of the system information recording area 16 is known and a present position on the optical disc medium 10 accessed by the optical head 42 is recognized. In this event, the optical disc apparatus may use the binary equalizing circuit 46 and the PRML circuit 47 by switching between the binary equalizing circuit 46 and the PRML circuit 47 at the known radius.

It will be assumed that a new optical disc medium 10 is inserted in the optical disc apparatus. In this event, a general apparatus control method comprises the steps of reproducing information from the system information recording area 16 using the binary equalizing circuit 46 to recognize necessary system information such as the type of the optical disc medium 10, and shifting the optical head 42 to the data information area 14.

What is claimed is:

1. A disc-shaped optical disc medium on which a spiral-shaped recording track is formed, said optical disc medium comprising a data recording area and a system information recording area which are set thereon with said optical disc medium divided in a radial direction thereof, wherein recording density of information on said system information recording area is lower than that of data on said data recording area wherein said system information recording area lies in an inner peripheral side of said optical disc medium, wherein said system information recording area has a shortest pit length which is substantially integer times as large as that of said data recording area, wherein said data recording area has a shortest pit length L1 of data to be recorded or reproduced that satisfies a relationship of $L1<0.35\times\lambda/NA$, where $\lambda$ represents a wavelength of a light source for using recording/reproducing and NA represents a numerical aperture of an object lens, and said data recording area has a signal quality evaluation index value (PRSNR) value defined by quality evaluation index in a partial-response maximum-likelihood (PRML) that is not less than fourteen;

said system information recording area having a shortest pit length L2 of data to be exclusively reproduced that satisfies a relationship of $L2>0.50\times\lambda/NA$; and said system information recording area having a track pitch which is wider than that of said data recording area.

2. The optical disc medium as claimed in claim 1, wherein said system information recording area has specific recoding density and is set in particular radial positions of said optical disc medium, said optical disc medium being one of three types of an exclusively reproduction type, an additionally recordable type, and a rewritable type, specific information being recorded on said system information recording area, the specific information being information for specifying that said optical disc medium is one of said three types.

3. An optical disc apparatus for recording or reproducing data in an optical disc medium comprising a data recording area and a system information recording area which are set thereon with said optical disc medium divided in a radial direction thereof, recording density of information on said system information recording area being lower than that of data on said data recording area, wherein said data recording area has a shortest pit length L1 of data to be recorded or reproduced that satisfies a relationship of $L1<0.35\times\lambda/NA$, where $\lambda$ represents a wavelength of a light source for using recording/reproducing and NA represents a numerical aperture of an object lens, and said data recording area having a signal quality evaluation index value (PRSNR) value defined by quality evaluation index in a partial-response maximum-likelihood (PRML) that is not less than fourteen;

said system information recording area having a shortest pit length L2 of data to be exclusively reproduced that satisfies a relationship of $L2>0.50\times\lambda/NA$; and said system information recording area having a track pitch which is wider than that of said data recording area, wherein said optical disc apparatus comprises:

a drive for rotating said optical disc medium;

an optical head for carrying out reproduction of information from the rotating optical disc medium to produce a reproduced signal;

a binary equalizing circuit for binary equalizing the reproduced signal when said optical head positions over said system information recording area; and a PRML circuit for partial-response equalizing the reproduced signal when said optical head positions over said data recording area.

* * * * *

UNITED STATES PATENT AND TRADEMARK OFFICE
CERTIFICATE OF CORRECTION

PATENT NO. : 7,355,957 B2 Page 1 of 1
APPLICATION NO. : 10/822373
DATED : April 8, 2008
INVENTOR(S) : Yamanaka et al.

It is certified that error appears in the above-identified patent and that said Letters Patent is hereby corrected as shown below:

The following reference should be included on the title page of the patent:

JP 2001-126268 5/2001

Signed and Sealed this

Fourteenth Day of July, 2009

JOHN DOLL
*Acting Director of the United States Patent and Trademark Office*